(12) United States Patent
Kirsch

(10) Patent No.: US 9,111,580 B2
(45) Date of Patent: Aug. 18, 2015

(54) TIME ALIGNMENT OF RECORDED AUDIO SIGNALS

(75) Inventor: James Kirsch, Salt Lake City, UT (US)

(73) Assignee: Harman International Industries, Incorporated, Northridge, CA (US)

(*) Notice: Subject to any disclaimer, the term of this patent is extended or adjusted under 35 U.S.C. 154(b) by 769 days.

(21) Appl. No.: 13/243,417

(22) Filed: Sep. 23, 2011

(65) Prior Publication Data

US 2013/0077805 A1 Mar. 28, 2013

(51) Int. Cl.
| | | |
|---|---|---|
| *G06F 17/00* | (2006.01) | |
| *G11B 27/30* | (2006.01) | |
| *G11B 27/031* | (2006.01) | |
| *G11B 27/10* | (2006.01) | |
| *G11B 27/11* | (2006.01) | |
| *H04N 21/43* | (2011.01) | |
| *H04N 21/81* | (2011.01) | |
| *H04N 21/8547* | (2011.01) | |
| *H04N 5/04* | (2006.01) | |

(52) U.S. Cl.
CPC .......... *G11B 27/3027* (2013.01); *G11B 27/031* (2013.01); *G11B 27/105* (2013.01); *G11B 27/11* (2013.01); *H04N 21/4302* (2013.01); *H04N 21/8106* (2013.01); *H04N 21/8547* (2013.01); *H04N 5/04* (2013.01)

(58) Field of Classification Search
None
See application file for complete search history.

(56) References Cited

U.S. PATENT DOCUMENTS

| 6,330,293 | B1 | 12/2001 | Klank et al. | |
|---|---|---|---|---|
| 7,512,886 | B1* | 3/2009 | Herberger et al. | 715/723 |
| 7,825,321 | B2 | 11/2010 | Bloom et al. | |
| 7,948,557 | B2 | 5/2011 | Sporer et al. | |
| 2012/0198317 | A1* | 8/2012 | Eppolito et al. | 715/202 |

FOREIGN PATENT DOCUMENTS

EP 1432168 A1 6/2004

OTHER PUBLICATIONS

Partial European Search Report of Mar. 18, 2013 for EP 12185443.4, pp. 1-8.
Committee 21DC: D-Cinema Distribution Master-Audio File Format and Delivery Constraints, vol. RP 428-4:2010, Mar. 31, 2010, pp. 1-15.
Extended European Search Report dated Jul. 13, 2013 for the Corresponding European Application 12185443.4 filed Sep. 21, 2012, pp. 1-14.

* cited by examiner

*Primary Examiner* — Fan Tsang
*Assistant Examiner* — David Siegel
(74) *Attorney, Agent, or Firm* — Brooks Kushman P.C.

(57) ABSTRACT

Systems and methods for time-aligning a first and second media signals. The first and second media signals may be audio signals recorded for combining as one audio performance or as an audio portion of an audio-video recording. The system retrieves the audio signals as digital samples generated using a common sampling rate. The system includes at least one coarse alignment function for reducing an initial misalignment between the first and second signal. The coarse alignment function may be configured to generate a coarse-shifted second signal. A fine alignment function determines an aligning time shift between the coarse-shifted second signal and the first signal by performing a cross-correlation between the first signal and the coarse-shifted second signal.

13 Claims, 10 Drawing Sheets

TIME ALIGNMENT OF RECORDED AUDIO SIGNALS

BACKGROUND

1. Field of the Invention

The invention relates to systems and methods for processing of media files, and more particularly, to systems and methods for aligning signals from different recordings of the same sound source.

2. Related Art

Audio and video recordings of a scene or performance on a stage, for example, often involve recording the video at a distance from the stage to ensure that the entire scene is visible. This makes it difficult to obtain good quality audio at the microphone on the video camera. The microphone on the video camera may pick up crowd noise, wind noise, HVAC/building noise, traffic noise, and may be further susceptible to excessive reverberation and absorption of high frequencies. In addition, microphones on video cameras may not be of sufficient quality. Audio is ideally recorded using microphones positioned close to the sound source to reduce the chance of picking up the mentioned noise in the environment. Individual microphones on specific sound sources, such as for example, each instrument in a band, may further reduce the susceptibility to the noise. In the context of concerts, stages are often equipped with localized audio pickups, on the floor of the stage, or hanging from the ceiling above the stage, for purposes of reinforcing the audio picked up by the microphone on the video camera. In generating the final video, the audio signals recorded from the close-proximity microphones may be preferred over the audio from the video camera microphone, or mixed with the camera microphone audio, which may be processed by bandpass filtering, attenuating, and adding to the close microphone audio in order to provide ambience to the final audio mix.

One problem with mixing an audio signal with a video signal recording of the same scene is that the signals are inherently unsynchronized. Mixing the signals requires alignment of the signals. For example, in scenes involving dialog, the audio should be aligned with the video so that the audio does not lag the video depiction of the characters speaking, or vice versa. High-end recording systems use a SMPTE time code to time-stamp and synchronize different audio signals. Such time-stamping is not always available on equipment at the consumer level. Audio may be synchronized during recording using a cable run, or wireless link between the close microphone and the video camera. However, synchronizing during recording requires planning and setting up in advance of recording, which is not often done.

Recordings may be made using the video camera with a microphone as one audio and video source and the close microphones as another source. Editing tools may then be used to integrate the second source of audio into the video recording. Such editing tools include for example, Roxio Creator™ and Sony Vegas™. Using an editing tool to integrate the audio from the second source with the video recording is often a laborious task requiring that the editor manually position the audio in the video in proper alignment. Even once properly aligned, the audio may slowly become misaligned even after only a minute of playback due to a drift between the two recordings.

The drift between the recordings may be due to clocks from different recorders having slightly different frequencies from one another. The drift may also be due to audio codecs with variable bit rates that may not preserve absolute time with the same accuracy. Another cause of the drift may be due to the movement of the camera during the performance being recorded. The effect of the drift is greater when the close microphone and video camera audio signals are to be mixed than if a single audio signal (i.e. if the close microphone signals replace the far microphone signals) is kept in the final file. As mixed signals drift farther apart from each other over time, the summation may sound comb-filtered, then reverberated, then overly reverberated, and then have discrete echoes. For single signals, reverberation and echo may not be an issue, however, lip synchronization between the video and audio becomes worse during the playback.

The difficulty of aligning an audio recording from one sound source with a video or audio recording of the same scene from another sound source has been described in the context of a recording from a camera placed a distance away from the scene and an audio recording from a microphone placed close to the scene. A similar problem is presented when sound is recorded on a movie set, for example, and dialog is re-recorded in the studio for inclusion in the final movie. This process, which is called Automated Dialog Replacement (ADR), is used to make dialog more intelligible (less noisy and less reverberant), to translate the dialog to a foreign language, or to remove or replace profanity in the original dialog. The replacement audio recording may not be a recording contemporaneous with the video recording of the scene. However, alignment issues arise when mixing the audio with the originally recorded video, which for purposes of this description, may be considered to be the same scene for the recordings being mixed. The problems with aligning audio signals may arise in other applications or scenarios that may not involve video recordings.

Alignment issues may also arise in the context of streaming media signals. The streaming of media signals has become ubiquitous and alignment issues may arise in various applications. For example, a high-definition ("HD") Radio station broadcasts both an analog transmission and digital transmission containing the same content. The broadcaster attempts (and sometimes fails) to align these transmissions manually. The receiver (i.e. the listener's radio receiver unit) is not equipped to align the two transmissions. Weather and geography (such as hills and other irregular surfaces) can result in the loss of the digital signal, at which point the receiver reverts to receiving the analog signal. The digital signal may fade in and out so that the receiver goes back and forth between the analog and digital signals. If the analog and digital signals are not aligned, the back and forth reception creates an annoying listening experience.

A need exists for ways to more easily and reliably align audio recordings taken of the same scene using different sources.

SUMMARY

Systems and methods for time-aligning a first and second media signals. The first and second media signals may be audio signals recorded for combining as one audio performance or as an audio portion of an audio-video recording. The audio signals may be recordings of the same performance from different sources. The system retrieves the audio signals as digital samples generated using a common sampling rate. The system includes at least one coarse alignment function for reducing an initial misalignment between the first and second signal. The coarse alignment function may be configured to generate a coarse-shifted second signal. A fine alignment function determines an aligning time shift between the coarse-shifted second signal and the first signal by performing a misalignment estimation between the first signal and the coarse-shifted second signal. Different coarse alignment functions may be used to reduce an initial misalignment between the signals, and to reduce the load on processing and memory resources that a substantial misalignment demands.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description below may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1A:
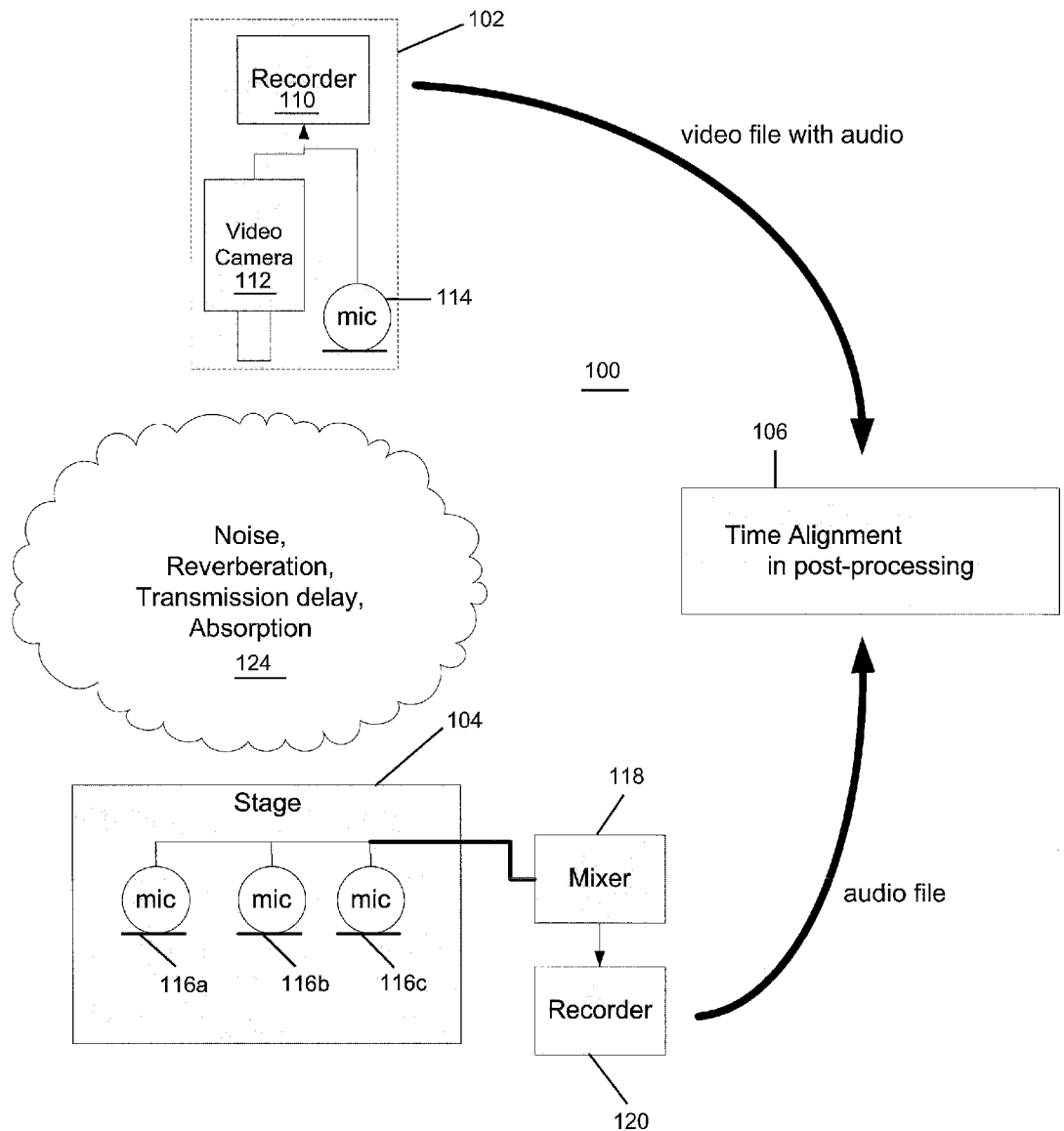
FIG. 1A is a schematic diagram illustrating operation of an example system for aligning media files.

FIG. 1A is a schematic diagram illustrating operation of an example system 100 for aligning media files. The system 100 in FIG. 1A includes a multimedia recorder 102, a stage 104, and a time alignment system 106 for aligning a media file from the video camera with a media file from the stage 104. The multimedia recorder 102 includes a signal recorder 110, a video camera 112, and a camera microphone 114. The multimedia recorder 102 in the system 100 may be operated by a user recording video of a scene or performance on the stage 104 from a location that provides a desired view for the multimedia recorder 102. The location selected may be at a distance from the stage 104 that is sufficient for background noise or effects from reverberations due to structures in the environment (at 124) of the stage 104 to affect the quality of the audio recorded at the multimedia recorder 102. The signal recorder 110 records and stores a video and audio recording of the performance on the stage 104 as a video file with audio.

One or more close microphones 116a-c may be positioned on, or in close proximity to the stage 104. The close microphones 116a-c may be positioned to pickup the desired audio portion of the performance on the stage 104. The desired audio may be transmitted to a mixer 118, which may be configured to transmit a mixed version of the desired audio to an audio recorder 120. The mixer 118 may be used to combine the audio signals received from each of the close microphones 116a-c in controlled ways. The audio recorder 120 generates an audio recording, or audio file, of the audio portion of the performance on the stage 104 using the mixed version of the desired audio.

In an example implementation, the video file with audio may be mixed in post-processing with the audio file from the audio portion of the performance recorded at close microphones 116a-c near the stage 104. The quality of the audio portion of the performance recorded at close microphones 116a-c may be substantially higher and more suitably processed for playback than the audio recorded by the multimedia recorder 102. The audio portion of the performance recorded at close microphones 116a-c is recorded from locations that are not subject to the environmental conditions 124 affecting the audio recording by the multimedia recorder 102. Prior to mixing the video file with audio with the audio file from the audio portion of the performance recorded at close microphones 116a-c, the time alignment system 106 aligns the files to ensure that the files are mixed starting from the same point in time relative to the performance.

It is noted that the time alignment system 106 may be provided in post-processing when recorded media files are available in some form of memory storage. The files may be accessed and input to the time alignment system 106 in any suitable manner, which may depend on the type of memory on which they are stored and the file input resources available to the time alignment system 106. In example implementations, the time alignment system 106 may operate in any suitable computer-controlled device having basic computer system resources. The time alignment system 106 may include any suitable file access system including an interface to portable storage devices such as USB devices, Flash drives, memory cards such as SD cards, tape drive interfaces for files stored on electronic tapes, and any other type of file access system suitable for accessing the media files. The time alignment system 106 may also include user interface devices such as a display, keyboard, mouse, keypad, knobs, buttons, etc. It is noted that the user interface requirements for the alignment process itself may be limited to starting and starting the process and basic feedback as the process is substantially automated. It is further noted that the time alignment system 106 may be implemented as a software application for operation on a standard computing system, such as a desktop, laptop, or workstation; or on a multimedia processing system having other functions in addition to time alignment.

In example implementations, the recorded media files may be provided as analog signals, or digital signals in any suitable format. Examples of suitable formats include, without limitation, any MPEG format (such as MP3 for example), M4A, MOV, QTFF (QuickTime), WMA, and popular PCM formats such as WAV and AIFF. It is to be understood that example implementations of the time alignment system 106 may be configured to receive the data in the media files in any suitable format. The audio data in the media files is accessed as either sampled audio signals, or as any type of data or signal that maintains the time line of the audio as recorded. The audio data may also be provided as two real-time streams. The real-time streams may be received over any type of electronic connection, such as a data network or over-the-air broadcast.

Figure 1B:
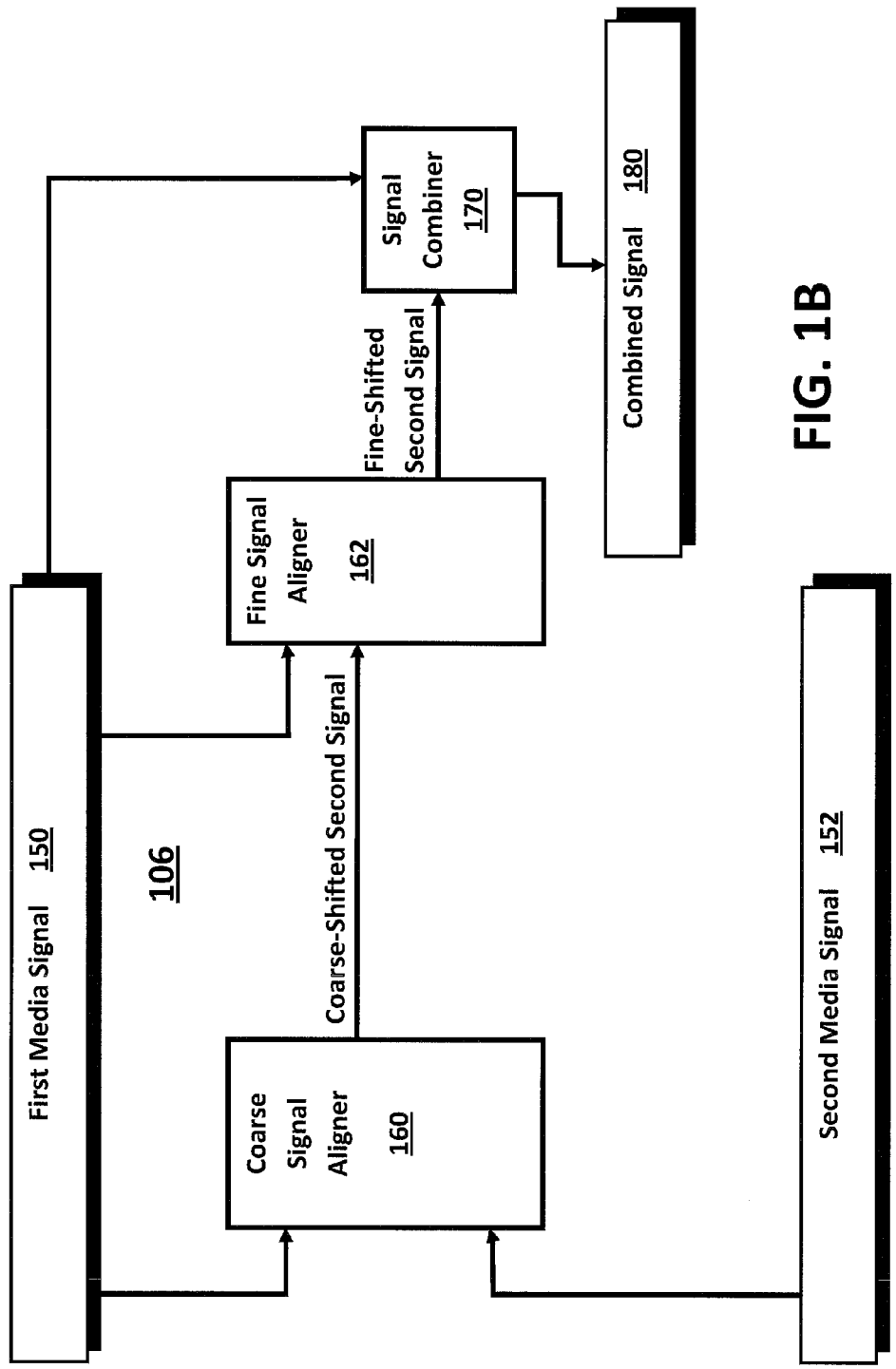
FIG. 1B is a block diagram of an example of a system for aligning media files.

FIG. 1B is a block diagram of an example of a system for aligning media files. The system in FIG. 1B may be implemented as the time alignment system 106 in FIG. 1A. The time alignment system 106 includes a coarse alignment function 160, a fine alignment function 162, and a signal combiner 170. The time alignment system 106 receives a first media signal 150 and a second media signal 152 for alignment. The first media signal 150 may be for example, the video file with audio signal, or the audio portion of the video file with audio, that is recorded by the multimedia recorder 102 in FIG. 1A. The second media signal 152 may be the audio portion of the performance recorded by the recorder 120 receiving audio signals picked up by the close microphones 116a-c in FIG. 1A. In any example implementation, the first and second media signals 150, 152 may be any two media signals recorded from different sources that are to be combined, or merged for playback. The two media signals recorded from different sources may be from recordings of the same performance. In an example implementation, one of the media signals may be one or more portions of audio that is to be integrated for playback in corresponding portions of the other media signal. Such an implementation includes, for example, dubbing audio to play a different language, or modifying dialog to remove objectionable language, or other similar applications.

The first media signal 150 and second media signal 152 may be in a format that allows access to digital samples that represent the audio signal and provides information including timing information. For example, the first and second media signals 150, 152 may be streams of digital samples converted from an analog representation of the corresponding analog signals. The streams of digital samples may be in an uncompressed form and converted from analog using a known sampling rate. The first media signal 150 and second media signal 152 may also be compressed digital audio signals. It is to be understood however that the first and second media signals 150, 152 are processed as described below in an uncompressed form, or in a manner that uses and maintains the timing in the signal relative to the performance. In the description below, it is to be understood that the first and second media signals 150, 152 are streams of digital samples of a converted analog audio signal converted at a known sampling rate. The digital samples may be stored in a series as an array or other suitable data structure. Each of the first and second media signals 150, 152 may also include a header or information block for storing information about each signal, such as the number of samples (size), starting point, sampling rate, recording start time, recording stop time, date, and other information that may be useful to maintain.

Referring to FIG. 1B, the time alignment system 106 receives the first media signal 150 and the second media signal 152 at the coarse alignment function 160. The coarse alignment function 160 reduces the initial misalignment of the media signals by performing an approximate alignment of the media signals. The two media signals 150, 152 may be initially misaligned to varying degrees. On a fine scale, two audio recordings may be shifted by less than a millisecond. On a coarse scale, if the audio recordings were performed at different distances to the source (as described with reference to FIG. 1A), the transmission time of the sound waves may create a misalignment in the order of tens or hundreds of milliseconds. On an even coarser scale, one of the audio recordings may have been started several minutes before the other recording creating a misalignment by tens of millions of samples. On an extremely coarse scale, the media signals 150, 152 may be a short clip (20 seconds for example) and a long recording (one hour for example); and it is desired to find the short clip in the long recording or to find a location for inserting the short clip into the long recording. The greater the initial misalignment between the first and second media signals 150, 152, the greater the computational load will be on the process of aligning them.

The coarse alignment function 160 determines a coarse time delay indicative of a coarse time shift that would bring one of the media signals in approximate time alignment with the other. The coarse alignment function 160 may also shift one of either the first or second media signal relative to the other. In the descriptions of the examples below, the second media signal 152 is shifted and output as the coarse-shifted second signal for purposes of describing the implementations. In specific implementations, either signal may be shifted relative to the other according to the specific requirements of the implementations.

The coarse alignment function 160 in FIG. 1B generates the coarse-shifted second signal as input to a fine alignment function 162. The coarse-shifted second signal may be generated as a substantial copy of the second media signal 152 where the starting point of the signal has been time-shifted. The starting point of the signal may be indicated by an index into the sequence of samples in the second media signal 152, for example. The index may be set to 0 or 1 as a default, and then modified pursuant to the coarse time delay. For example, the index may be incremented (or decremented if shifting in the other direction and the index does not indicate the first sample in the signal) by the number of samples equivalent to the coarse time delay based on the given sampling rate.

The fine alignment function 162 performs a 'per sample' alignment of the first media signal 150 and the coarse-shifted second signal. The 'per sample' alignment may include performing a misalignment estimation of the misalignment between the two signals, and then shifting one of the signals by the determined misalignment. In an example implementation, the misalignment estimation may include determining a correlation of the two signals and analyzing the results of the correlation to determine if there is a peak for any of the time shifts analyzed. If a peak is detected, the coarse-shifted second signal is shifted by a fine time delay to generate a fine shifted second signal. The fine shifted second signal may then be combined with the first media signal 150 in a signal combiner 170.

The signal combiner 170 may combine the signals in any manner deemed suitable for the specific application using the alignment system. In the example illustrated in FIG. 1A, one of the media signals is the video signal with audio recorded by the multimedia recorder 102 and the other media signal is the audio portion of the performance. The signal combiner 170 may generate a combined signal 180 by replacing the audio recorded by the multimedia recorder 102 with the fine shifted second signal, or by simply discarding the audio portion of the media signal having both audio and video. The signals may also be mixed with the audio signal in the media signal having both audio and video added at a lower level to provide ambience in the combined signal. The signal combiner 170 may also generate the combined signal 180 as having the first media signal 150 in one audio channel and the fine-shifted second signal in another channel.

It is noted that the misalignment estimation is described here as performing a correlation function without intending to limit how misalignments are determined. The correlation function may be a "cross-correlation" function; however other methods may be implemented as well. Other methods that may be used to determine a misalignment between two signals include, without limitation, Time Delay Spectrometry, phase unwrapping, and any suitable analysis based on correlation, coherence, or mutual information of the two signals. Any suitable time delay estimation function may be used for performing a misalignment estimation. Similarly, the determination of a coarse time delay in the coarse alignment function 160 may be performed using any suitable correlation function or suitable time delay estimation function. The coarse time delay may also be determined as described below using pattern matching techniques, or other similar methods in which one media clip is located or positioned in another media clip.

It is further noted that the determination of a misalignment is described herein as including identifying a "peak" in results of a cross-correlation, such as in a histogram. The peak may be detected from correlation values that may be either positive or negative. The desired peak has the maximum absolute value in the correlation. The misalignment may also be determined by calculating a center of mass in the cross-correlation results. In a center of mass calculation, each position in the cross-correlation is averaged using a weighting equal to the absolute value of the correlation value. A peak that is broad and skewed may be may be better estimated using center of mass. A very strong peak will have a center of mass equal to a peak that would be identified by pattern recognition or other less precise methods. Peaks may also be detected by differentiating the results and may include using known algorithms such as the Hilbert Transform for example. It is to be understood that the term "peak" refers herein to an indication of a misalignment estimate in the results of a misalignment estimate calculation regardless of the technique used to determine the misalignment.

In example implementations of the time alignment system 106 of FIG. 1B, different coarse alignment functions may be used depending on the application and/or the extent of the misalignment. In an example implementation, one or more coarse signal alignments may be performed in sequence before performing the per sample fine alignment of the media signals. The coarse alignment functions described with reference to FIGS. 2-4 include signal-conditioning processes for reducing the computational load. Three types of signal conditioning processes may be used: (1) sub-sampling, (2) envelope detection, and (3) feature abstraction. FIGS. 2-4 show examples of three coarse alignment functions that use these three processes.

Figure 2A:
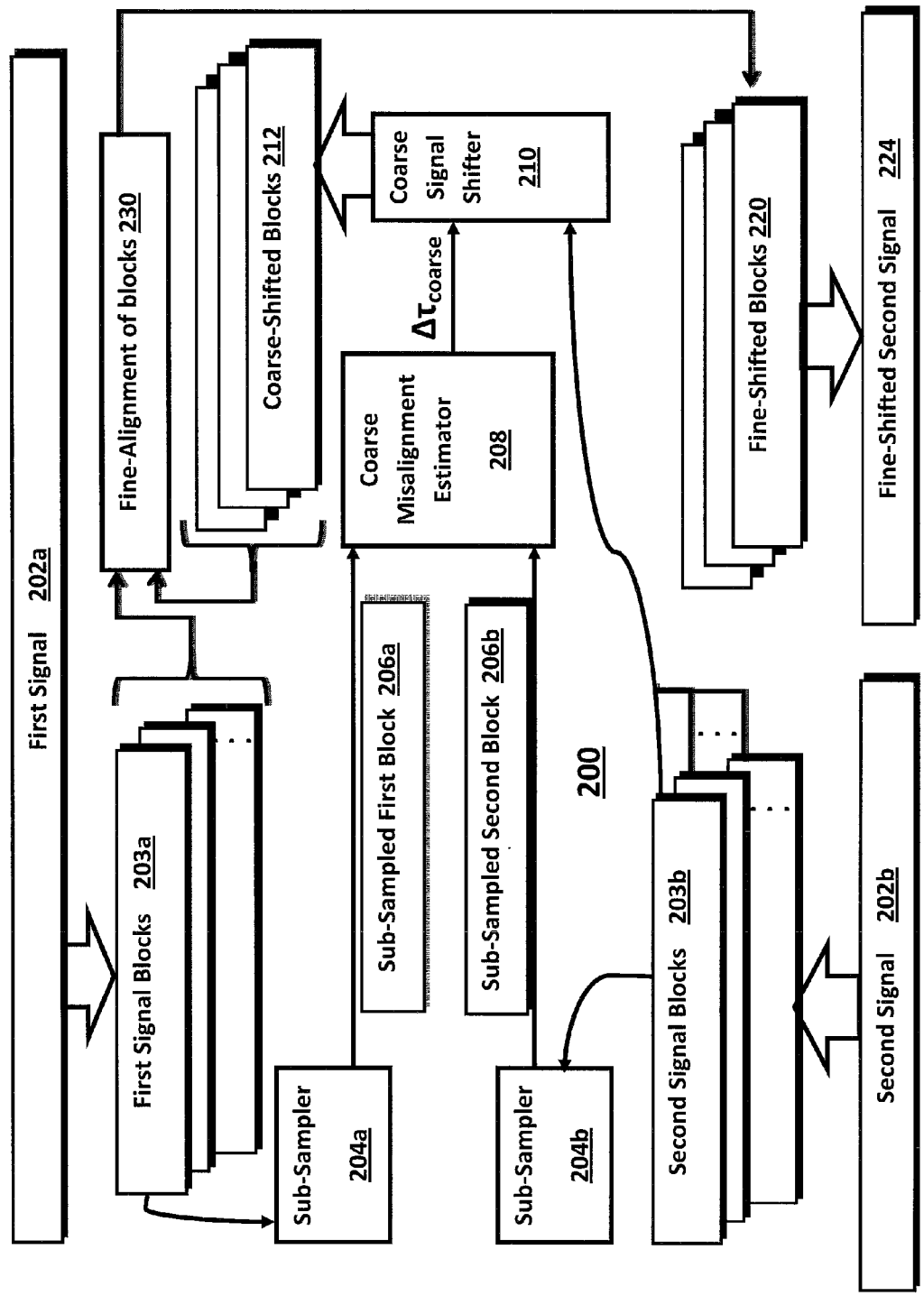
FIG. 2A is a block diagram of an example of a coarse alignment function that may be used in the system illustrated in FIG. 1B.

FIG. 2A is a block diagram of an example of a first coarse alignment function 200 that may be used in the system illustrated in FIG. 1B. The first coarse alignment function 200 in FIG. 2A illustrates block processing of a first media signal 202a and a second media signal 202b. The first and second media signals 202a, 202b may correspond to the media signals 150, 152 described above with reference to FIG. 1B. The first and second media signals 202a, 202b may also be coarsely aligned media signals that have been partially aligned using coarse signal alignment in prior steps of an alignment process.

FIG. 2A illustrates dividing the media signals 202a, 202b into blocks 203. The processing of smaller blocks 203 may be useful when the media signals 202a, 202b require very large memory resources. The smaller blocks 203 may also be used to correct potential errors in alignment due to drift in the recording devices. Recording devices, such as the multimedia recorder 102 and the audio recorder 120 (in FIG. 1A), may drift over time and some may drift more than others. The difference in the drift between the two recorders (such as the multimedia recorder 102 and the audio recorder 120 in FIG. 1A, for example) may cause errors in the alignment. The drift between the recorders may be estimated by performing a cross-correlation of the two media signals 202a, 202b and analyzing a histogram of the results of the cross-correlation. A difference in drift between two recorders may be determined by measuring the width of the main peak in the histogram. The drift may also be determined by estimating the effective delay at different blocks. The effective delay may increase over time due to the drift. Wider peaks are an indication that multiple peaks have been smeared together. The width of the peak may determine the size of individual blocks 203.

The size of the blocks 203a, b should be set to a size that is larger than several times the maximum possible drift. The blocks may be processed such that a misalignment is calculated for each block. Each block's misalignment may be used to redefine subsequent blocks as each block is processed thereby reducing the possible drift between the two media signals 202a, 202b. For example, assuming that a misalignment of M samples is determined at a time block X starting T samples after the beginning of the recording with of duration D samples, the signal in block X of the second signal blocks 203b is to be shifted by M samples. Block X+1 for the first signal blocks 203a is defined to start at T+D samples, however, block X+1 of the second signal blocks 203b is defined to start at T+D+M samples.

Figure 2B:
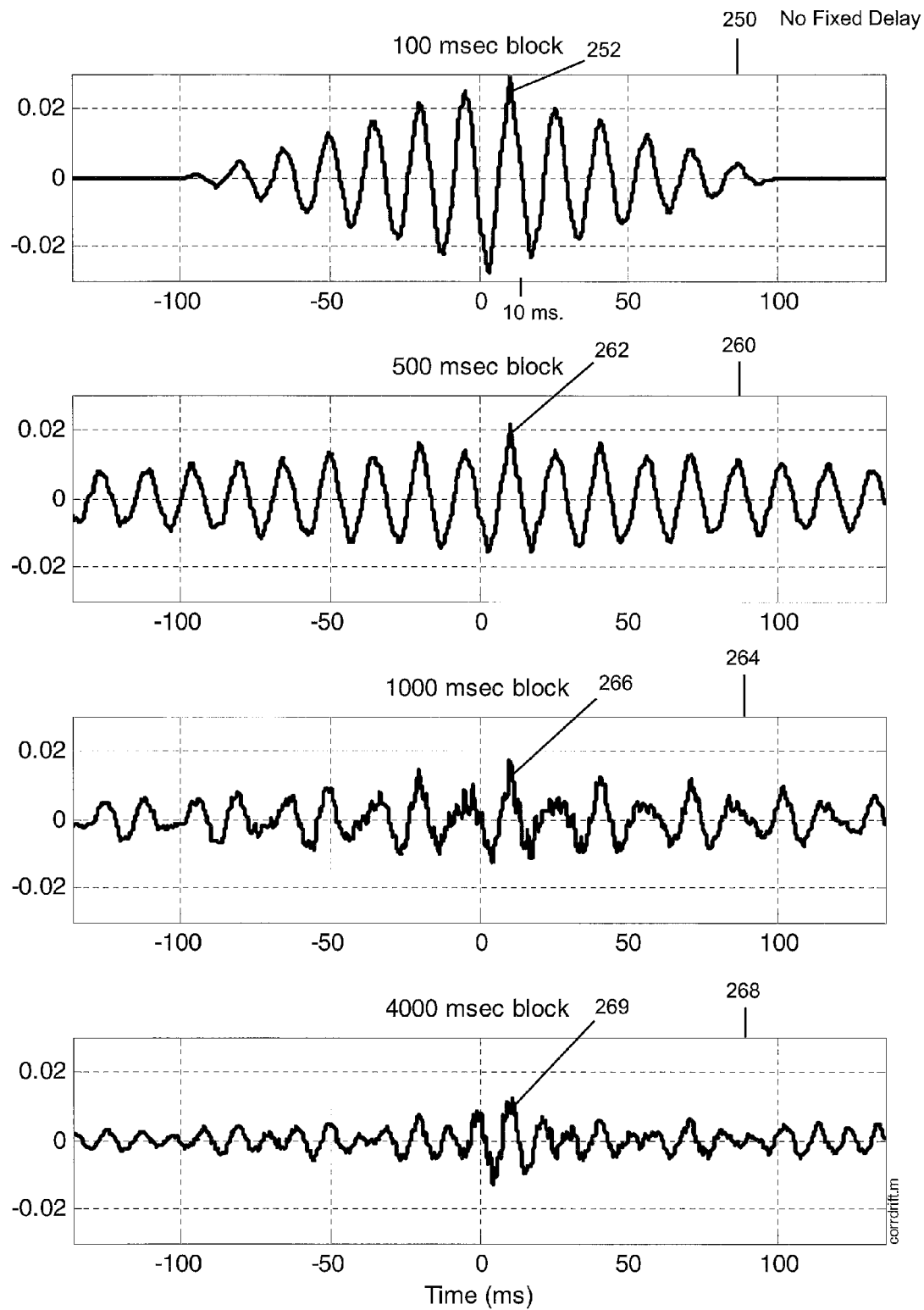
FIGS. 2B-2C are examples of histograms illustrating results of a correlation between two signals.
Figure 2C:
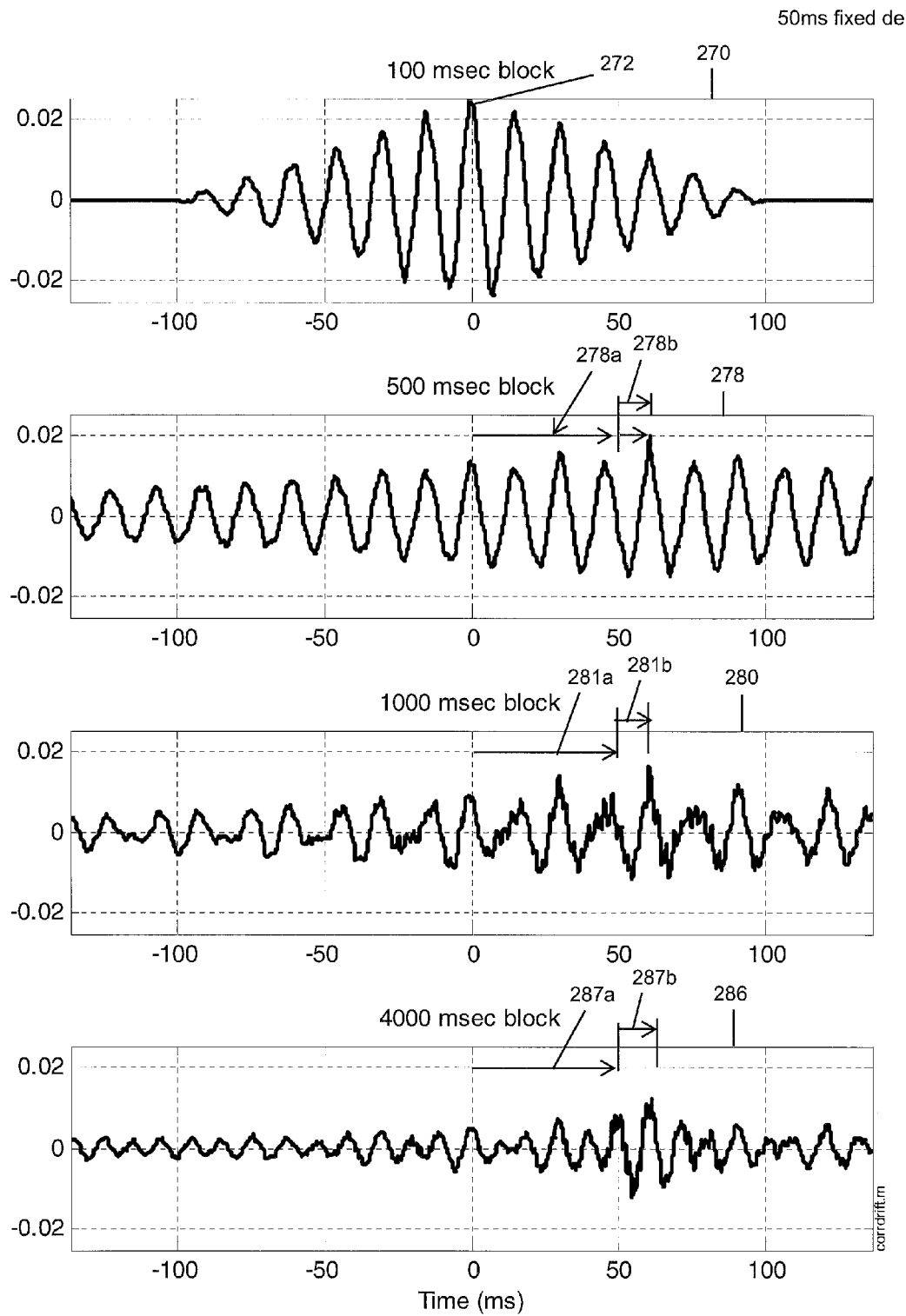

FIGS. 2B and 2C are examples of histograms provided to illustrate the effect of the size of the block on the effective delay. FIG. 2B shows the results of four correlations between two signals divided into blocks having four different sizes with no fixed delay between the signals. The four results in FIG. 2B include a 100 msec. block correlation 250, a 500 msec. block correlation 260, a 1000 msec. block correlation 264, and a 4000 msec. block correlation 266. The 100 msec. block correlation 250 has a 100 msec. block peak 252; the 500 msec. block correlation 260 has a 500 msec. peak 262; the 1000 msec. block correlation 264 has a 1000 msec. block peak 266; and the 4000 msec. block correlation 266 has a 4000 msec. block peak 269. The correlations 250, 260, 264, and 266 in FIG. 2B show that as the block size increases, the peak value (at 252, 262, 266, and 269) of the correlation is reduced and has more samples contributing to the peak. The area around the peak also gets noisier as the block size increases.

FIG. 2C shows the results of another group of four correlations between two signals divided into blocks having four different sizes, but with a 50 msec. fixed delay between the signals. The four results in FIG. 2C include a 100 msec. block correlation 270, a 500 msec. block correlation 278, a 1000 msec. block correlation 280, and a 4000 msec. block correlation 286. One of the signals correlated as shown in FIG. 2C was delayed 50 msec. from the other. The 100 msec. block correlation 270 has a 100 msec. block peak 272 that does not show any delay. The 500 msec. block correlation 260 has a 500 msec. peak 279 at 50 msec. 279a plus another 10 msec. 279b reflecting the fixed delay plus the drift. The 1000 msec. block correlation 264 also has a 1000 msec. block peak 281 at 50 msec. 281a showing the fixed 50 msec. delay, plus another 10 msec. 281b showing the drift. The 4000 msec. block correlation 286 has a 4000 msec. block peak 287 at 50 msec. 287a plus the 10 msec. 287b drift.

The results shown in FIG. 2B without any intentionally inserted fixed delay illustrate a drift causing about 10 msec. of effective delay. The drift is detectable at all block sizes. The results in FIG. 2C, which have the intentionally inserted 50 msec. delay, also show the drift causing the 10 ms of effective delay. However, due to the intentional 50 msec. delay, the effective delay is detectable in the lower 3 panels (at 278, 280, and 286), but is not detectable in the 100 msec. block 270 having the small (100 ms) block size.

The block processing of the media signals 202a, 202b shown in FIG. 2A shows the first signal 202a divided into first signal blocks 203a and the second signal divided into second signal blocks 203b. The first and second signal blocks 203a, 203b are then processed to determine a coarse alignment using sub-sampling as described in further detail below. In example implementations, the coarse alignment processing may be performed using a corresponding pair of blocks from each signal. For example, the first block from each signal may be used for coarse alignment. Depending on the application, or on characteristics of the signals, or on selected parameters based on user preferences, the coarse alignment may be performed by processing all of the blocks or some of the blocks in each signal. Multiple coarse time delays may be used for analysis, or for determining an approximate single best value, or for other desired purposes. Once the coarse time delay is determined and the signal alignment is approximated, a coarse-shifted block 212 is generated. For per-sample alignment, or for fine alignment the signals 202a, 202b, all of the first signal blocks 203a are processed by fine alignment of blocks 230 with corresponding coarse-shifted blocks 212 to generate fine-shifted blocks 220.

It is noted that while division of the media signals 202a, 202b is described with reference to the sub-sampling coarse alignment function in FIG. 2A, the division into blocks may be performed for any of the coarse signal analyzers illustrated in FIGS. 2-4. It is also noted that the sub-sampling coarse alignment function in FIG. 2A does not require any anti-aliasing filters since the aliased components may assist the time-shift detection between the sub-sampled signals. In an example in which correlation is used to detect the time shift, the aliased components assist the correlation function. Referring to FIG. 2A, the first coarse alignment function 200 uses sub-sampling of the media signals to reduce the computational load by reducing the size of the media signals. In the first coarse alignment function 200 in FIG. 2A, the first and second signals 202a, 202b are each sub-sampled by corresponding sub-samplers 204a, 204b. The first coarse alignment function 200 in FIG. 2A performs the coarse alignment based on sub-sampling by using the first and second signal blocks 203a, 203b from each of the first and second signals 202a, 202b. The sub-samplers 204a, 204b receive the first and second signal blocks 203a, 203b and extract samples at a sub-sampling factor, which may be an integer number indicating that samples at every sub-sampling factor value from each other are to be extracted. For example, each sub-sampler 204a, 204b may extract every $8^{th}$ sample from the corresponding input signal blocks 203a, 203b reducing the size of each of the signal blocks 203a, 203b by a sub-sampling factor of 8. The sub-samplers 204a, 204b generate corresponding sub-sampled first and second blocks 206a, 206b. The sub-sampled first and second blocks 206a, 206b are used for alignment of the corresponding first and second blocks, which involves a first step of determining the delay between the two blocks, and a second step of shifting one of the blocks relative to the other in accordance with the delay. In the example shown in FIG. 2A, the first and second sub-sampled first and second blocks 206a, 206b are provided as input signals to a coarse misalignment estimator 208. In an example implementation, the coarse misalignment estimator 208 performs a cross-correlation of the first and second sub-sampled first and second block 206a, 206b. Cross-correlation of two signals is a well-known function to those of ordinary skill in the art and does not require any further detailed description. The cross-correlation may generate a histogram, which plots cross-correlation values against the time delays or shifts between the signals within a predetermined range. Histograms, and their use in analyzing the results of cross-correlations, are also well known to those of ordinary skill in the art. The time delay on the histogram having the highest correlation between the two signals has the highest level and appears as a peak in the histogram. If a peak appears in the histogram, the time delay corresponding to the peak is designated as the time by which one of the blocks 206a, 206b should be shifted relative to the other in order to bring the blocks 206a, 206b into alignment.

It is noted that while the coarse misalignment estimator 208 is described here as incorporating a cross-correlation function for determining the delay between the two signal blocks 206a, 206b by identifying the shift in the peak in the correlation results, the coarse misalignment estimator 208 is not to be limited to the use of a cross-correlation function. Other delay detection functions that may be used include, without limitation, Time Delay Spectrometry, phase unwrapping, and any suitable analysis based on correlation, coherence, or mutual information of the two signals. The coarse misalignment estimator 208 may also perform a correlation and analyze a histogram for peak detection. Peak detection may also include differentiating the results, which may include using known algorithms such as the Hilbert Transform. A suitable center of mass calculation of the results of the correlation may also be used for peak detection.

The alignment provided by the coarse misalignment estimator 208 in FIG. 2A is a coarse alignment because the blocks 206a, 206b used in the cross-correlation have been sub-sampled. If a peak is not detected in the histogram resulting from the cross-correlation performed by coarse misalignment estimator 208 in FIG. 2A, the coarse signal alignment may be repeated. The coarse signal alignment may be repeated using the first coarse alignment function 200 in FIG. 2A using different parameters. For example, the sub-sampling performed by sub-samplers 204a, 204b may sub-sample the blocks a sub-sampling factor that is less than the previous sub-sampling factor, such as from every 8 to every 6. A smaller sub-sampling factor would have the effect of further reducing the size of the block. Alternatively, another attempt at a coarse signal alignment may be made using one of the other coarse alignment functions.

When the coarse misalignment estimator 208 determines a coarse time shift from a detected peak in the histogram, a coarse signal shifter 210 uses the coarse time shift ($\Delta\tau_{coarse}$ in FIG. 2A) to perform a coarse signal shift on the block 206a, 206b used in the cross-correlation that corresponds to one of the media signals. The coarse signal shifter 210 may perform the signal shift by correcting the coarse time shift, $\Delta\tau_{coarse}$, by the sub-sampling factor used to generate the first and second sub-sampled blocks 206a, 206b. The corrected coarse time shift may then be used to shift the second signal block used as the input to the second sub-sampler 204b. It is noted that while the second signal is shifted in the example shown in FIG. 2A, the first signal may be the signal shifted in accordance with specific implementations. During the signal shifting, the coarse signal shifter 210 may involve padding one of the signals with, for example, zero values on one side, or truncating of the other signal on the other side.

The coarse signal shifter 210 processes all of the second signal blocks 203b to generate a corresponding set of coarse-shifted blocks 212. The coarse shifted blocks 212 and the first signal blocks 203a may then be processed by fine-alignment on blocks 230 to generate the fine-shifted blocks 220.

Figure 3A:
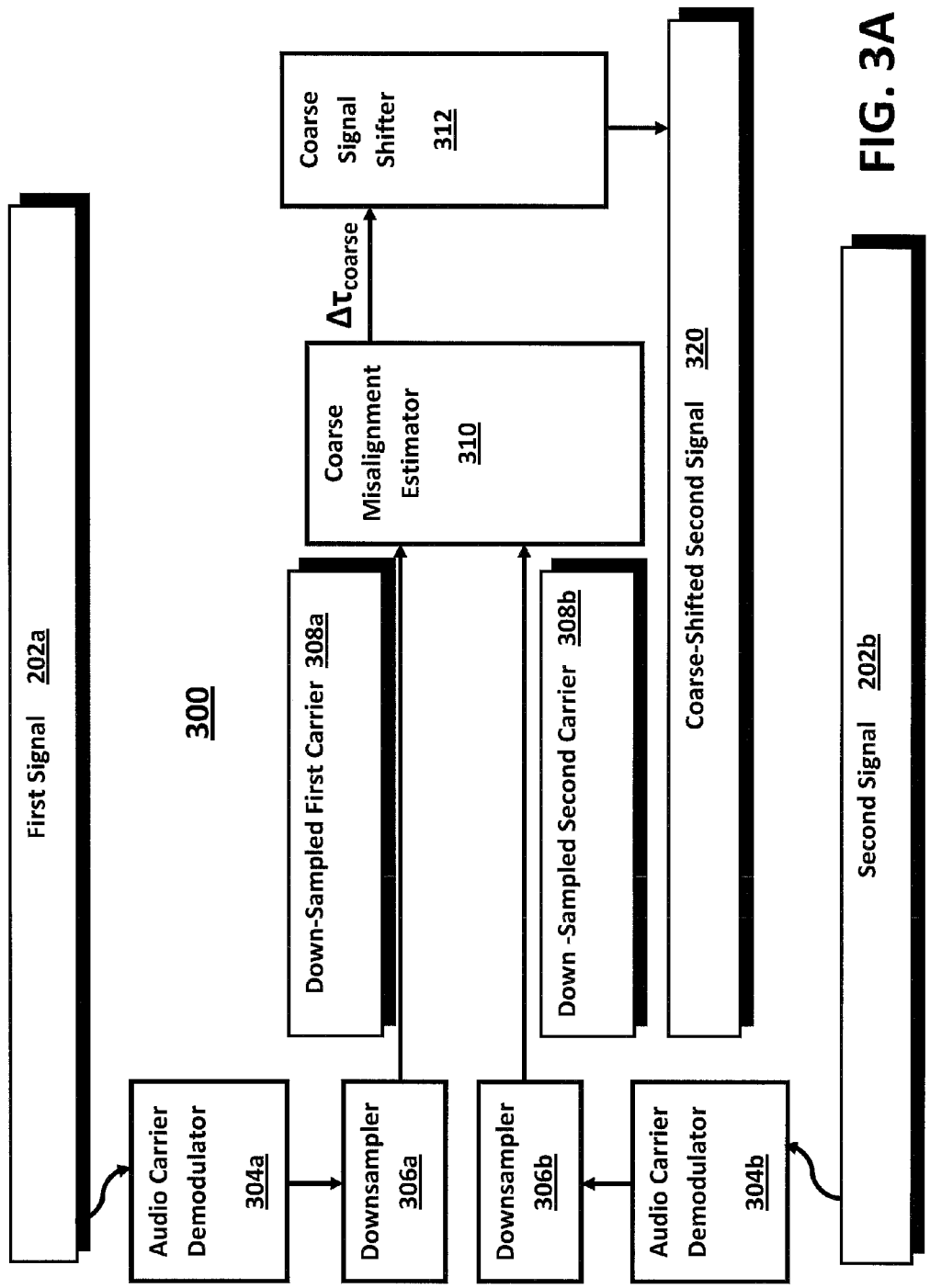
FIG. 3 is a block diagram of another example of a coarse alignment function that may be used in the system illustrated in FIG. 1B.

FIG. 3A is a block diagram of an example of a second coarse alignment function 300 that may be used in the system illustrated in FIG. 1B. The second coarse alignment function 300 in FIG. 3A includes a first audio carrier demodulator 304a, a second audio carrier demodulator 304b, a first downsampler 306a, a second downsampler 306b, a coarse misalignment estimator 310, and a coarse signal shifter 312. The second coarse alignment function 300 in FIG. 3 operates by detecting the envelope of the audio signals and performing a cross-correlation on the envelopes. Envelope detection of each media signal 202a, 202b is performed by demodulating the audio carrier. The audio carrier demodulators 304a, 304b may detect the envelopes by rectifying and low-pass filtering each signal according to, for example: $y(n)=(1-\alpha)\ y(n-1)+abs(\alpha x(n))$.

Figure 3B:
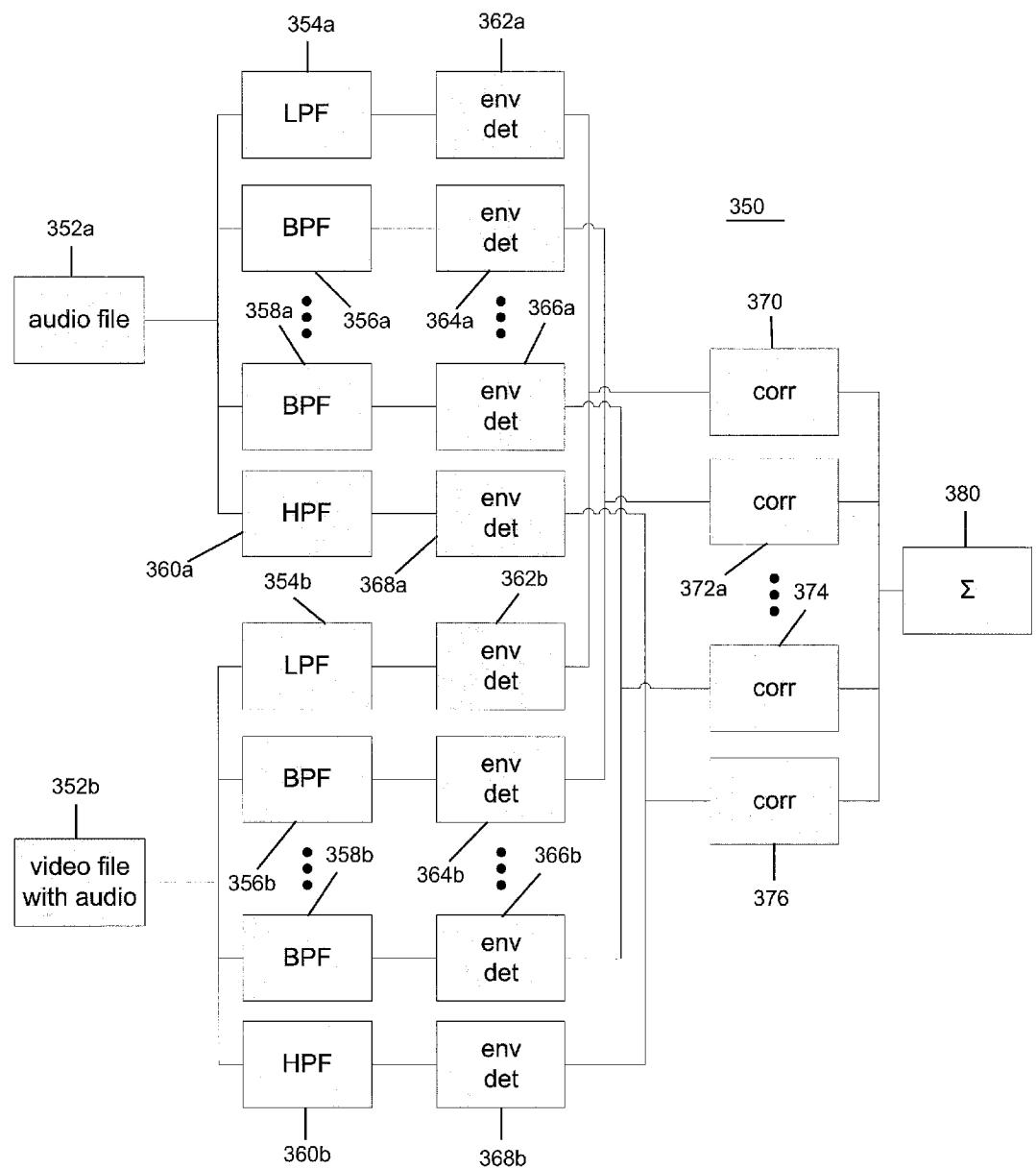
Figure 4:
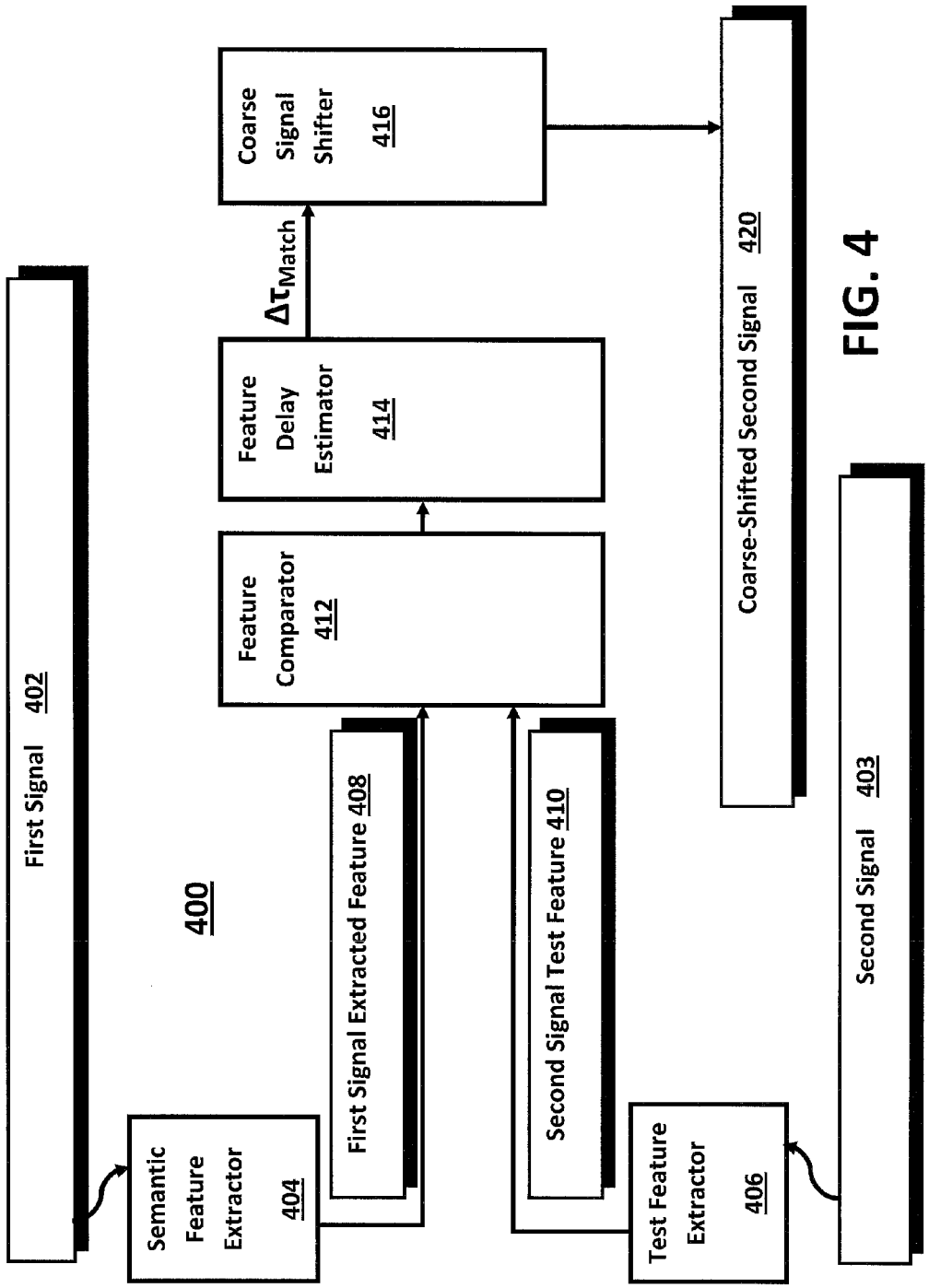
FIG. 4 is a block diagram of another example of a coarse alignment function that may be used in the system illustrated in FIG. 1B.

The downsamplers 306a, 306b receive the detected envelopes corresponding to the first and second media signals 202a, 202b and downsamples each envelope. The envelopes may be downsampled by as much as a factor of up to 1000 to lighten the CPU load and memory requirements. For some signals, the heavy downsampling may remove tonal or pitch information, which may yield multiple false estimates of the effective delays in very rhythmic passages and make alignment more difficult. The pitch information may be restored using a filter bank cascaded with multiple (per-bank) envelope detectors in order to make individual delay estimates more credible. FIG. 3B illustrates an example coarse alignment function 350 using envelope detection and filter banks.

The coarse alignment function 350 in FIG. 3B shows an audio file 352a and a video file with audio 352b as input media signals to be aligned. The audio file 352a is input to a filter bank having a low pass filter 354a, a first band pass filter 356a, a second band pass filter 358a, and a high pass filter 360a. As shown in FIG. 3B, more than two band pass filters 356a, 358a may be used. The video file with audio 352b is input to a second filter bank having a low pass filter 354b, a first band pass filter 356b, a second band pass filter 358b, and a high pass filter 360b. The filters 354a, 356a, 358a, 360a in the first filter bank correspond to the filters 354b, 356b, 358b, 360b in the second filter bank. Each filter 354a, 356a, 358a, 360a in the first filter bank is input to a corresponding envelope detector function 362a, 364a, 366a, 368a. Each filter 354b, 356b, 358b, 360b in the first filter bank is input to a corresponding envelope detector function 362b, 364b, 366b, 368b.

A first correlator function 370 performs a correlation of the envelope generated from the low pass filtered audio signal at envelope detector 362a and the envelope generated from the low pass filtered video file with audio signal at envelope detector 362b. A second correlator function 372 performs a correlation of the envelope generated from the band pass filtered audio signal at envelope detector 364a and the envelope generated from the band pass filtered video file with audio signal at envelope detector 364b. A third correlator function 374 performs a correlation of the envelope generated from the band pass filtered audio signal at envelope detector 366a and the envelope generated from the band pass filtered video file with audio signal at envelope detector 366b. A fourth correlator function 376 performs a correlation of the envelope generated from the high pass filtered audio signal at envelope detector 368a and the envelope generated from the high pass filtered video file with audio signal at envelope detector 368b. The results of the correlations performed at the first correlator 370, the second correlator 372, the third correlator 374, and the fourth correlator 376 are then added at histogram adding function 380 to provide results from which a peak that accounts for the bandwidth of the signals may be detected.

Referring back to FIG. 3A, the downsampler 306a generates a downsampled first envelope 308a and the downsampler 306b generates a downsampled second envelope 308b. The first and second downsampled envelopes 308a, 308b are cross-correlated using the cross-correlation function 310. The cross-correlation function 310 generates a coarse time shift ($\Delta\tau_{coarse}$ in FIG. 3A), which may be based on a peak detected in a histogram of the cross-correlation as described above with reference to FIG. 2A. The coarse time shift, $\Delta\tau_{coarse}$, may then be used by the coarse signal sifter 312 to align the first and second signals 202a, 202b. The coarse signal sifter 312 may perform the alignment of the signals by coarse shifting the second signal 202b by the corrected coarse time shift, $\Delta\tau_{coarse}$, to yield a coarse-shifted second signal 320. The coarse-shifted second signal 320 may then be used in another coarse alignment function, or in a fine alignment by per-sample shifting to achieve a more precise alignment.

FIG. 4 is a block diagram of an example of a third coarse alignment function 400 that may be used in the system illustrated in FIG. 1B. The third coarse alignment function 400 in FIG. 4 may be used in applications that permit substitution of a clip of audio in an audio recording with a second clip of audio that was not necessarily recorded contemporaneously with the original audio recording. The second clip may also be a recording of another source. An example of an application involving such substitution of audio clips includes dubbing, or automatic dialog replacement (ADR), in motion picture or television soundtracks. Another example involves using alternate takes of a musical instrument in a musical composition.

In operation, the third coarse alignment function 400 may use an original audio recording as the first signal 402 and a second clip to be inserted into the original recording as the second signal 403. The third coarse alignment function 400 includes a first feature extraction function 404 for identifying a feature or pattern in the first signal 402 that may be compared to features or patterns in the second signal 403. A second feature extraction function 406 may be used to identify test features or patterns to be compared to the feature or pattern identified by the first feature extraction function 404. The first and second feature extraction functions 404, 406 may identify features or patterns based on the type of signals 402, 403 used as input. The features or patterns may be extracted for speech recognition for audio signals 402, 403 that includes dialog. The features or patterns may also be extracted for pattern recognition for audio signals that include music. The feature extraction functions 404, 406 generate a first signal extracted feature 408 and a second signal test feature 410, respectively for comparison by a feature comparator 412.

The feature comparator 412 may match the extracted features using known speech or pattern recognition functions in accordance with the type of signals being compared. It is to be understood that the feature extraction functions 404, 406 and the feature comparator 412 may be arranged in a variety of ways in accordance with specific applications. The feature comparator 412 identifies matches in features. If two features are determined to matching, a feature delay estimator 414 determines a time delay ($\Delta\tau_{Match}$ in FIG. 4) for the match. The time delay may be a time elapsed in the first signal 402, which represents the original audio recording, to a starting point of the matched feature. It is noted that the first and second signals 402, 403 may originate from recordings of different sound sources. The resolution of the alignment of the two signals 402, 403 corresponding to the time delay determined by the feature delay estimator 414 may depend on the similarity of the two recordings. The time delay, $\Delta\tau_{Match}$, may be used by a coarse signal shifter 416 to generate a coarse-shifted second signal 420. In an example, the coarse-shifted second signal 420 may be a copy of the second signal 403 having timing information indicating the point at which it may be inserted into the first signal 402.

The coarse alignment functions 200, 300, 400 shown in FIGS. 2, 3, and 4, respectively, may be used to reduce a substantial misalignment that may be present in the first and second media signals. The coarse alignment may be performed in iterations or repeated, using either the same or different coarse alignment functions each time depending on how much the two signals are misaligned. The extent of the misalignment of the two signals may be tracked in an example implementation by tracking the decrease in the time delay determined each time a cross-correlation is performed. When the signals are approximately aligned, the signals may be processed by a fine alignment function to bring the signals in substantial alignment.

Figure 5:
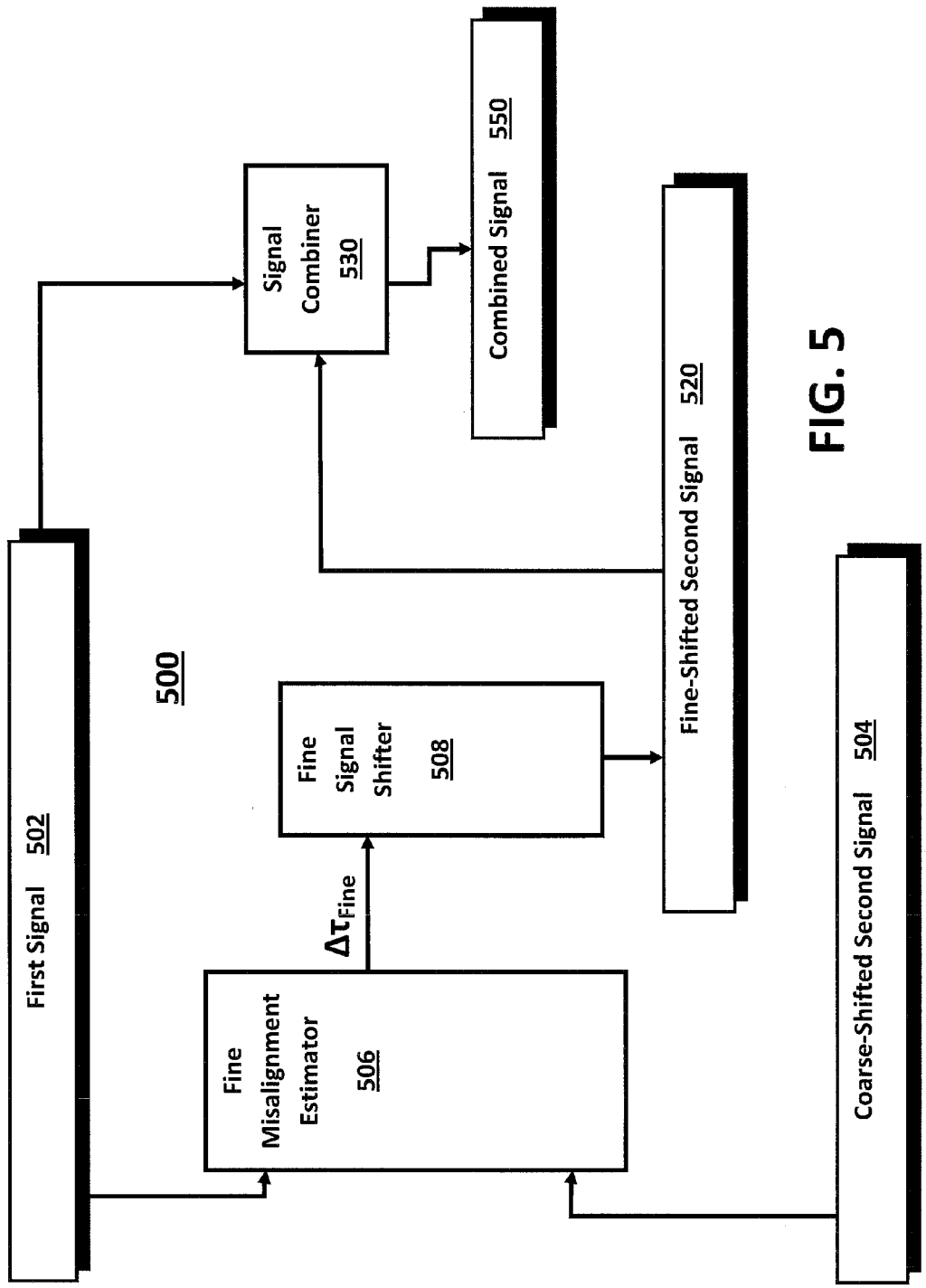
FIG. 5 is a block diagram of an example of a fine alignment function that may be used in the system illustrated in FIG. 1B.

FIG. 5 is a block diagram of an example of a fine alignment function 500 that may be used in the system illustrated in FIG. 1B. The fine alignment function 500 includes a fine misalignment estimator 506 to determine a delay between a first signal 502 and a second signal 504. The fine misalignment estimator 506 generates a fine alignment time delay ($\Delta\tau_{Fine}$ in FIG. 5), which may be used by a fine signal shifter 508 to shift one of the two signals by the fine alignment time delay, $\Delta\tau_{Fine}$. In the example shown in FIG. 5, the second signal 504 may be shifted by the fine alignment time delay, $\Delta\tau_{Fine}$, to yield a fine shifted second signal 520. A signal combiner 530 may combine the fine-shifted second signal 520 with the first signal 502 to generate a combined signal 550 in accordance with the specific application using the time alignment system.

The fine misalignment estimator 506 in FIG. 5 may include a cross-correlation function configured to perform a cross-correlation of the two signals and to generate results as a histogram having a peak indicative of the delay between the two signals. The fine misalignment estimator 506 may also include delay detecting functions such as, without limitation: Time Delay Spectrometry, phase unwrapping, and any suitable analysis based on correlation, coherence, or mutual information of the two signals. The fine misalignment estimator 506 may also perform a correlation and analyze a histogram for peak detection. Peak detection may also include the use of differentiation, or the Hilbert Transform, or a suitable center of mass calculation of the results of the correlation.

Figure 6:
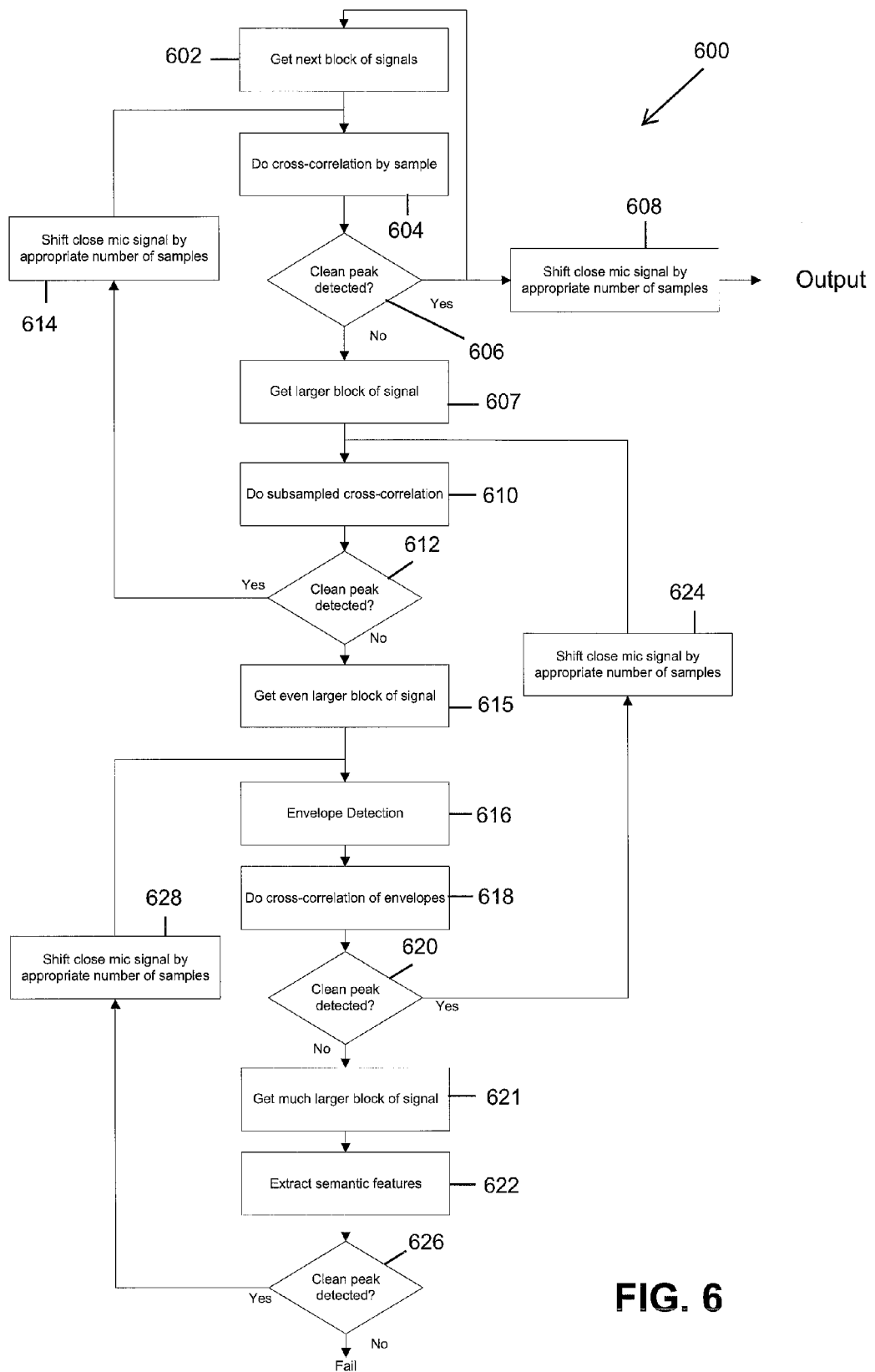
FIG. 6 is a flowchart illustrating examples of methods for aligning media files.

FIG. 6 is a flowchart 600 illustrating examples of methods for aligning media files. The example method illustrated in the flowchart 600 may be performed in system for aligning media files 100 described above with reference to FIG. 1A. The method processes the media files by receiving the files, or by first breaking up the files, in blocks. Blocks may be input sequentially until all of the blocks that make up each file are processed.

At step 602, a first pair of blocks of signals is input for processing. As the process continues, step 602 performs the step of retrieving the next pair of blocks of signals for processing. Each block in the pair of blocks is a next block to be processed in the first and second signals being aligned. At step 604, a cross-correlation may be performed on the input pair of blocks. The initial cross-correlation is a sample-by-sample cross-correlation that may provide a time delay for alignment of blocks that are not significantly misaligned.

At decision block 606, the cross-correlation results may be analyzed. In one example, the results are analyzed by generating histogram over a range of time delays. The histogram is checked for peaks. If a peak is detected, the misalignment between the blocks may be corrected by the time delay indicated at the peak. At step 608, the time delay for the blocks is used to shift the signal recorded at the close microphones, for example, in FIG. 1A. The time delay is used to determine the number of samples in the time delay determined by the peak at decision block 606. The number of samples may be used to shift the entire signal as shown at step 608.

If a peak was not detected at decision block 606, another coarse alignment function may be selected for processing the pair of blocks. At step 607, a larger block of signal may be retrieved for the next coarse alignment function. At step 610, a sub-sampling coarse alignment function is performed on the pair of blocks. The sub-sampling coarse alignment may be performed as described above with reference to FIG. 2A. A sub-sampling factor may be determined based on an estimated misalignment, or a default value may be used. Each sample separated by the sub-sampling factor number of samples is extracted from the pair of blocks in parallel before a cross-correlation is performed on the blocks. At decision block 612, the results of the cross-correlation are analyzed to detect a peak. If a peak is detected, the block corresponding, for example, to the recorded from the close microphones shown in FIG. 1A is shifted at step 614 by the number of samples corresponding to the time delay indicated by the detected peak. The time delay (and number of samples) may be corrected by the sub-sampling factor. The shifted block and the block corresponding to the audio portion of the video and audio signal captured by the multimedia recorder in FIG. 1A are provided to a fine alignment function where a sample-by-sample cross-correlation is performed as shown by step 604 in FIG. 6.

If no peak is detected at decision block 612, another coarse alignment function may be selected for processing the pair of blocks. At step 615, a larger block of signal may be retrieved for the next coarse alignment function. At step 616, an envelope detection coarse alignment function 616 may be performed on the pair of blocks. The envelope detection coarse alignment function at step 616 may proceed as described above with reference to FIG. 3. At step 618, a cross-correlation is performed on the envelopes of each block. At decision block 620, the cross-correlation results are analyzed for a peak. If a peak is detected, the block corresponding, for example, to the recorded from the close microphones shown in FIG. 1A is shifted at step 624 by the number of samples corresponding to the time delay indicated by the detected peak. The shifted block and the block corresponding to the audio portion of the video and audio signal captured by the multimedia recorder in FIG. 1A may then be provided to the sub-sampling coarse alignment function at step 610 to further approximate the alignment before performing a fine alignment.

If a peak is not detected at decision block 620, another coarse alignment function may be selected for processing the pair of blocks. At step 621, a larger block of signal may be retrieved for the next coarse alignment function. A semantic or pattern feature extraction coarse alignment function may be performed on the pair of blocks at step 622. The feature extraction coarse alignment function may be performed as described above with reference to FIG. 4. A pattern or speech recognition function may be performed on selected features. Such functions typically involve performing cross-correlation on the selected features or on processed versions of the selected features. At decision block 626, the results of the pattern or speech recognition is tested to detect a peak. If a peak is detected, the block corresponding, for example, to the recorded from the close microphones shown in FIG. 1A is shifted at step 628 by the number of samples corresponding to the time delay indicated by the detected peak. The shifted block and the block corresponding to the audio portion of the video and audio signal captured by the multimedia recorder in FIG. 1A may then be provided to the envelope detection coarse alignment function at step 616 to further approximate the alignment before performing a fine alignment.

If a peak is not detected at decision block 626, the misalignment of the blocks or other characteristics of the blocks may not permit for a suitable alignment. For example, the recordings may not be sufficiently similar. The recordings may be subject to further processing before attempting to re-align the signals.

It is noted that not all of the coarse alignment functions are required for an example method for aligning signals. In addition, if a peak is not detected using one of the alignment functions, the alignment function may be repeated using different parameters.

It will be understood, and is appreciated by persons skilled in the art, that one or more processes, sub-processes, or process steps described in connection with FIGS. 1-6 may be performed by hardware and/or software. If the process is performed by software, the software may reside in software memory (not shown) in a suitable electronic processing component or system such as, one or more of the functional components or modules schematically depicted in FIGS. 1-6. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for time-aligning a first media signal and a second media signal, the method comprising:
   receiving the first and second media signals as streams of digital samples generated using a sampling rate;
   determining an approximate misalignment between the first and second media signals;
   selecting a first coarse alignment function from a plurality of coarse alignment functions based on the approximate misalignment between the first and second media signals;
   determining a first coarse time shift using the first coarse alignment function;
   shifting the second media signal by the first coarse time shift to generate a first coarse-shifted second signal;
   selecting a second coarse alignment function from the plurality of coarse alignment functions;
   determining a second coarse time shift using the second coarse alignment function;
   shifting the first coarse-shifted second signal by the second coarse time shift to generate a second coarse-shifted second signal;
   determining an aligning time shift between the first media signal and the second coarse-shifted second signal; and
   shifting the second coarse-shifted second signal by the aligning time shift to generate a shifted second signal aligned with the first media signal.

2. The method of claim 1 where the step of determining the aligning time shift includes using any of the following methods:
   performing a cross-correlation of the first media signal and the second coarse-shifted second signal, and identifying a peak in a set of cross-correlation results in a selected range of time delays;
   performing Time Delay Spectrometry;
   performing a correlation and differentiating the results for peak detection;
   performing a correlation and using the Hilbert Transform for peak detection;
   performing a correlation and using center of mass calculations for peak detection; performing phase unwrapping; and
   performing an analysis based on mutual information of the first and second media signals.

3. The method of claim 1 where:
   the first coarse alignment function and the second coarse alignment function are different.

4. The method of claim 1 where:
   the step of determining a first coarse time shift includes using a different one of the plurality of coarse alignment functions when the first coarse time shift could not be determined using the first selected first coarse alignment function.

5. The method of claim 1 where:
   the first coarse alignment function and the second coarse alignment function are the same.

6. The method of claim 1 where using the first to obtain first and second sub-sampled media signals coarse alignment function includes:
   sub-sampling each of the first and second media signals by a sub-sampling factor; and
   detecting a delay between the first and second sub-sampled media signals;
   where determining the first coarse time shift includes using the detected delay.

7. The method of claim 6 where the step of detecting the delay includes using any of the following methods:
   performing a cross-correlation of the first and second sub-sampled media signals, where the step of determining the first coarse time shift includes identifying a peak in a set of cross-correlation results in a selected range of time delays;
   performing Time Delay Spectrometry;
   performing a correlation and differentiating the results for peak detection;

performing a correlation and using the Hilbert Transform for peak detection; performing a correlation and using center of mass calculations for peak detection; performing phase unwrapping; and performing an analysis based on mutual information of the first and second media signals.

8. The method of claim 1 where using the first coarse alignment function includes:

demodulating each of the first and second signals to detect a first and second signal envelope;

down-sampling the first and second signal envelopes by a down-sampling factor to generate a first down-sampled envelope and a second down-sampled envelope; and detecting a delay between the first and second down-sampled envelopes;

where the step of determining the first coarse time shift includes using the detected delay.

9. The method of claim 8 where the step of detecting the delay includes using any of the following methods:

performing a cross-correlation of the first and second down-sampled envelopes, where the step of determining the coarse time shift includes identifying a peak in a set of cross-correlation results in a selected range of time delays;

performing Time Delay Spectrometry;

performing a correlation and differentiating the results for peak detection;

performing a correlation and using the Hilbert Transform for peak detection;

performing a correlation and using center of mass calculations for peak detection;

performing phase unwrapping; and performing an analysis based on mutual information of the first and second media signals.

10. The method of claim 1 where using the first coarse alignment function includes:

extracting a signal feature from the second media signal;

extracting a signal portion from the first media signal;

comparing the signal feature with the signal portion;

if the signal portion matches the signal feature, identifying a time delay to a starting time of the signal portion in the first media signal; and repeating the steps of extracting the signal portion from first media signal and comparing the signal feature with the signal portion until the signal portion matches the signal feature.

11. The method of claim 10 where:

the steps of extracting signal feature and signal portions includes extracting speech elements in the first and second media signals; and the step of comparing the signal feature and the signal portion includes performing speech recognition functions.

12. The method of claim 10 where:

the steps of extracting signal feature and signal portions includes extracting signal patterns or semantic features in the first and second media signals; and the step of comparing the signal feature and the signal portion includes performing pattern recognition functions.

13. The method of claim 1 where the step of receiving the first and second media signals further includes:

determining a block size smaller than a media signal size;

dividing each first and second media signal into a plurality of blocks; and processing corresponding blocks of the first and second media signals in the steps of using the first coarse alignment function and determining a first coarse time shift.

* * * * *